United States Patent
Ji et al.

(10) Patent No.: US 12,432,733 B2
(45) Date of Patent: Sep. 30, 2025

(54) MAXIMUM PDCCH PROCESSING CAPABILITY ALLOCATION METHOD, TERMINAL DEVICE, AND NETWORK DEVICE

(71) Applicant: VIVO MOBILE COMMUNICATION CO., LTD., Dongguan (CN)

(72) Inventors: Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 418 days.

(21) Appl. No.: 17/962,537

(22) Filed: Oct. 9, 2022

(65) Prior Publication Data

US 2023/0045655 A1  Feb. 9, 2023

Related U.S. Application Data

(63) Continuation of application No. PCT/CN2021/086159, filed on Apr. 9, 2021.

(30) Foreign Application Priority Data

Apr. 9, 2020  (CN) .......................... 202010275752.4

(51) Int. Cl.
*H04W 72/20* (2023.01)
*H04L 5/00* (2006.01)
(Continued)

(52) U.S. Cl.
CPC .......... *H04W 72/20* (2023.01); *H04L 5/0094* (2013.01); *H04W 48/16* (2013.01); *H04W 72/12* (2013.01)

(58) Field of Classification Search
None
See application file for complete search history.

(56) References Cited

U.S. PATENT DOCUMENTS

2018/0295608 A1* 10/2018 Nguyen .............. H04W 72/044
2019/0349155 A1* 11/2019 Xu .......................... H04L 5/0042
2022/0174660 A1*  6/2022 Ji ........................... H04L 5/0053

FOREIGN PATENT DOCUMENTS

CN  110740479 A  1/2020
CN  110830216 A  2/2020
(Continued)

OTHER PUBLICATIONS

Extended European Search Report issued in related European Application No. 21784967.8, mailed Aug. 21, 2023, 13 pages.
(Continued)

*Primary Examiner* — Srinivasa R Reddivalam
(74) *Attorney, Agent, or Firm* — IPX PLLC (57) ABSTRACT

A maximum PDCCH processing capability allocation method includes: obtaining cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, or the scheduling information indicates that one second cell schedules a plurality of second target cells at a time, and the first cell, the second cell, the first target cell, and the second target cell are cells in the plurality of configured cells; determining a total quantity of cells according to the cell configuration information; and allocating a maximum PDCCH processing capability of the terminal device based on the total quantity of cells and a maximum blind detection capability of the terminal device.

20 Claims, 3 Drawing Sheets

(51) Int. Cl.
*H04W 48/16* (2009.01)
*H04W 72/12* (2023.01)

(56) References Cited

FOREIGN PATENT DOCUMENTS

WO 2020015643 A1 1/2020
WO 2020031426 A1 2/2020

OTHER PUBLICATIONS

Intel Corporation, "Remaining aspects on Rel-16 PDCCH enhancements for URLLC", 3GPP Draft, R1-2000735, Feb. 2020, 20 pages.
Qualcomm Invorporated, "Maintenance for physical downlink control channel", 3GPP Draft, R1-1809426, Aug. 2018, 15 pages.
International Search Report issued in corresponding International Application No. PCT/CN2021/086159, mailed Jun. 25, 2021, 4 pages.
Vivo, "Remaining issues on cross-carrier scheduling with mix numerologies", 3GPP TSG-RAN WG1 Meeting #100 R1-2000350, Mar. 6, 2020.
Huawei et al., "Remaining issues on search space", 3GPP TSG RAN WG1 Meeting #93 R1-1805881, May 25, 2018.
First Office Action issued in related Chinese Application No. 202010275752.4, mailed Mar. 2, 2022, 10 pages.
Qualcomm Incorporated, "Maintenance for physical downlink control channel", 3GPP TSG RAN WG1 Meeting #94, R1-1809426, Aug. 2018.
Vivo, "Remaining issues on PDCCH search space", 3GPP TSG RAN WG1 Meeting #92bis, R1-1803828, Apr. 2018.
Vivo, "Discussion on the search space configuration of cross-carrier scheduling", 3GPP TSG RAN WG1 Meeting #95, R1-1812277, Nov. 2018.

* cited by examiner

MAXIMUM PDCCH PROCESSING CAPABILITY ALLOCATION METHOD, TERMINAL DEVICE, AND NETWORK DEVICE

CROSS-REFERENCE TO RELATED APPLICATIONS

The application is a continuation of International Application No. PCT/CN2021/086159, filed on Apr. 9, 2021, which claims priority to Chinese Patent Application NO. 202010275752.4, filed on Apr. 9, 2020. The entire contents of each of the above-identified applications are expressly incorporated herein by reference.

TECHNICAL FIELD

The present disclosure relates to the communications field, and in particular, to a maximum Physical Downlink Control CHannel (PDCCH) processing capability allocation method, a terminal device, and a network device.

BACKGROUND

In a 5G New Radio (NR) system, one or more carriers (Component Carrier (CC)) or cells can be configured for User Equipment (UE). When the UE is configured in a single carrier mode or a self-scheduling mode in Carrier Aggregation (CA), a plurality of COntrol REsource SET (CORESET) and a plurality of Search Space (SS) may be configured for each CC or cell, including a Common Search Space (CSS) and a UE-specific search space (USS). A network may flexibly configure a quantity of blind detections for each search space set, and a CORESET may be flexibly associated with the search space set. The UE obtains scheduling information of each cell by blindly detecting a PDCCH by using various Radio Network Temporary Identities (RNTIs) and demodulating Downlink Control Information (DCI) according to the configured CORESET and SS. Each piece of DCI is used to schedule data of one cell.

If channel quality of some cells is not good enough, or when a channel blocking probability is high, the network may configure cross-carrier scheduling for the UE, that is, configure a control channel in another cell (for example, a primary cell (Pcell)) with better channel quality, and perform cross-carrier scheduling data of another cell (for example, a secondary cell (SCell)). SubCarrier Spacings (SCSs) of a scheduling cell and a scheduled cell may be the same or different. The scheduling cell may be in a self-scheduling mode, and the cell schedules itself only in this case. The scheduled cell does not have a PDCCH, and can only be scheduled by one scheduling cell.

To reduce embodiment complexity of the UE, a maximum PDCCH processing capability of the UE for blindly detecting one CC or cell is specified in the NR system. The capability includes two parts: a maximum quantity of PDCCH candidates for blind detection in a slot, and a maximum quantity of channel estimates required by the UE for performing blind detection, that is, a quantity of non-overlapping Control Channel Elements (CCEs). The maximum processing capability of the UE is related to an SCS of a CC or a cell on which blind detection is performed, that is, processing capabilities of different SCSs in a next slot are different.

When UE is configured with CA of a plurality of cells, the UE groups the cells according to $\mu$ (that is, SCSs) of scheduling cells, and allocates the maximum PDCCH processing capability of the UE among groups.

Currently, in the Release 15 NR system, one cell can only be scheduled by one scheduling cell (that is, only being scheduled itself or being scheduled by another cell), and the PCell can only be scheduled by the PCell itself. However, in actual application, there may be a requirement that one cell is scheduled by a plurality of scheduling cells or one cell schedules a plurality of cells at a time. In this case, currently, no effective solution is provided.

SUMMARY

Embodiments of the present disclosure provide a maximum PDCCH processing capability allocation method, a terminal device, and a network device.

According to a first aspect, a maximum PDCCH processing capability allocation method is provided. The method is applied to a terminal device and includes: obtaining cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; determining a total quantity of cells according to the cell configuration information; and allocating a maximum physical downlink control channel PDCCH processing capability of the terminal device based on the total quantity of cells and a maximum blind detection capability of the terminal device.

According to a second aspect, a PDCCH transmission method is provided. The method is applied to a network device and includes: sending cell configuration information to a terminal device, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; determining allocation of a maximum PDCCH processing capability of the terminal device according to the cell configuration information; and scheduling a PDCCH of the terminal device based on the allocation of the maximum PDCCH processing capability of the terminal device.

According to a third aspect, a terminal device is provided, including: an obtaining module, configured to obtain cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; a first determining module, configured to determine a total quantity of cells according to the cell configuration information; and an allocation module, configured to allocate a maximum physical downlink control channel PDCCH processing capability of the terminal device based on the total quantity of cells and a maximum blind detection capability of the terminal device.

According to a fourth aspect, a network device is provided, including: a sending module, configured to send cell configuration information to a terminal device, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; a second determining module, configured to determine allocation of a maximum PDCCH processing capability of the terminal device according to the cell configuration information; and a scheduling module, configured to schedule a PDCCH of the terminal device based on the allocation of the maximum PDCCH processing capability of the terminal device.

According to a fifth aspect, a terminal device is provided, including a memory, a processor, and a computer program that is stored in the memory and that can be run on the processor, where when the computer program is executed by the processor, the steps of the method in the first aspect are implemented.

According to a sixth aspect, a network device is provided, including a memory, a processor, and a computer program that is stored in the memory and that can be run on the processor, where when the computer program is executed by the processor, the steps of the method in the second aspect are implemented.

According to a seventh aspect, a computer-readable storage medium is provided. The computer-readable storage medium stores a computer program, and when the computer program is executed by a processor, the steps of the method in the first aspect or the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure can be applied to various communications systems, such as a Global System for Mobile communications (GSM), a Code Division Multiple Access (CDMA) system, a Wideband Code Division Multiple Access (WCDMA) system, a General Packet Radio Service (GPRS) system, a Long Term Evolution (LTE)/Long Term Evolution-Advanced (LTE-A) system, and an New Radio (NR) system.

User Equipment (UE), also referred to as a terminal device, a mobile terminal, a mobile user device, or the like, may communicate with one or more core networks through a Radio Access Network (RAN). The user equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

A base station may be a Base Transceiver Station (BTS) in the GSM or the CDMA, may be a NodeB in the WCDMA, or may be an evolutional NodeB (eNB or e-NodeB) and a 5G base station (gNB) in the LTE. This is not limited in the present disclosure. However, for ease of description, description is provided by using the gNB as an example in the following embodiments.

The following describes in detail the technical solutions provided in the embodiments of the present disclosure with reference to the accompanying drawings.

Figure 1:
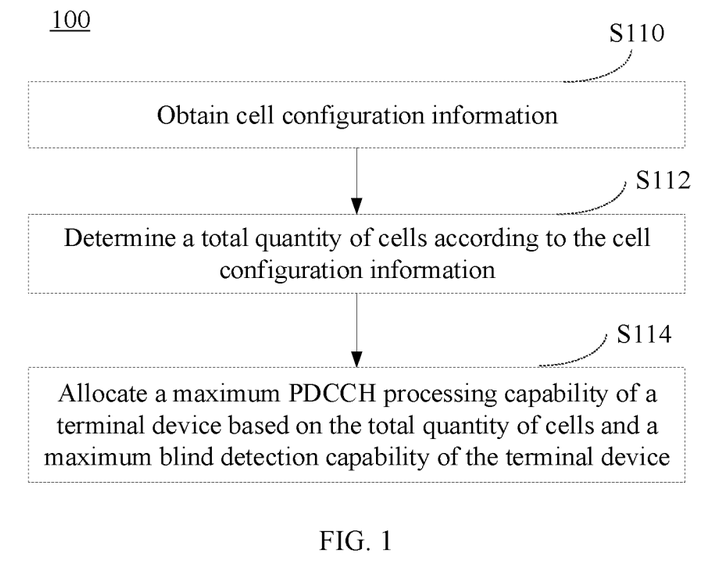
FIG. 1 is a schematic flowchart of a maximum PDCCH processing capability allocation method according to an embodiment of the present disclosure.

FIG. 1 is a schematic flowchart of a maximum PDCCH processing capability allocation method according to an embodiment of the present disclosure. The method 100 may be performed by a terminal device. In other words, the method may be performed by software or hardware installed in the terminal device. As shown in FIG. 1, the method may include the following steps.

S110. Obtain cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells.

In this embodiment of the present disclosure, the terminal device may receive the cell configuration information from a network side. The network side may match, for the terminal device, the plurality of configured cells for carrier aggregation according to a network status, each cell status, or the like.

In this embodiment of the present disclosure, in the scheduling information indicated by the scheduling information, SCSs of the first cell and the first target cell may be the same or different. Similarly, SCSs of the second cell and the second target cell may be the same or different. This is not specifically limited in this embodiment of the present disclosure.

In this embodiment of the present disclosure, the first cell may be a Primary Cell (PCell) or a Primary Secondary cell (PSCell), or may be a Secondary Cell (SCell). That is, in this embodiment of the present disclosure, both the PCell and the SCell may be scheduled by a plurality of first target cells, and the first target cell may also be a PCell or a SCell. Therefore, in this embodiment of the present disclosure, a high-frequency band carrier may be configured as the SCell, and the PCell is scheduled by using the SCell, so that a problem that a capacity of a control channel of the PCell is limited can be resolved, and control channel PDCCH overheads can be reduced.

In this embodiment of the present disclosure, the second cell may be a PCell, or may be a SCell. That is, in this embodiment of the present disclosure, both the PCell and the SCell may schedule a plurality of second target cells at a time. The second cell schedules the plurality of second target cells at a time. The terminal device only needs to monitor a PDCCH from the second cell, and does not need to simultaneously monitor PDCCHs from two scheduling cells, thereby reducing demodulation complexity and power consumption of UE and reducing hardware costs of the UE.

In this embodiment of the present disclosure, a manner in which the second cell schedules the plurality of second target cells at a time may be that the second cell sends one piece of special downlink control information (DCI) to simultaneously schedule the plurality of second target cells.

S112. Determine a total quantity of cells according to the cell configuration information.

In this embodiment of the present disclosure, scheduled cells may be determined according to a total quantity of configured cells indicated in the cell configuration information and a scheduling status of each configured cell indicated by the scheduling information, the scheduled cells are grouped according to SCSs of scheduling cells of the scheduled cells, a quantity of cells included in each SCS group is determined, and then the total quantity of cells is determined according to the quantity of cells included in each SCS group.

S114. Allocate a maximum PDCCH processing capability of the terminal device based on the total quantity of cells and a maximum blind detection capability of the terminal device.

In this embodiment of the present disclosure, a maximum PDCCH processing capability of UE includes two parts: (1) a maximum quantity of PDCCH candidates for blind detection in a slot, and a maximum quantity of channel estimates required by the UE for performing blind detection, that is, a quantity of non-overlapping Control Channel Element (CCE). The maximum processing capability of the UE is related to an SCS of a CC or a cell on which blind detection is performed, that is, processing capabilities of different SCSs in a next slot are different. For example, Table 1 provides an SCS configuration supported by the UE, Table 2 provides a maximum quantity of PDCCH candidates in each slot in different SCS configurations of the UE, and Table 3 provides a maximum quantity of non-overlapping CCEs in each slot in different SCS configurations of the UE.

TABLE 1

| $\mu$ | $\Delta f = 2^{\mu} \cdot 15[kHz]$ |
|---|---|
| 0 | 15 |
| 1 | 30 |
| 2 | 60 |
| 3 | 120 |

TABLE 2

| $\mu$ | Maximum quantity $M_{PDCCH}^{max,slot,\mu}$ of PDCCH candidates in each slot |
|---|---|
| 0 | 44 |
| 1 | 36 |
| 2 | 22 |
| 3 | 20 |

TABLE 3

| $\mu$ | Maximum quantity $C_{PDCCH}^{max,slot,\mu}$ of non-overlapping CCEs in each slot |
|---|---|
| 0 | 56 |
| 1 | 56 |
| 2 | 48 |
| 3 | 32 |

In some embodiments, in S114, if the total quantity of cells is greater than the maximum blind detection capability, the maximum PDCCH processing capability of the terminal device is allocated among the SCS groups according to a ratio of the quantity of cells included in each SCS group to the total quantity of cells. That is, the maximum PDCCH processing capability of the UE is allocated among the SCS groups according to the ratio.

According to the technical solution provided in this embodiment of the present disclosure, when a network side configures a configured cell for CA for UE, if it is indicated that a first cell is scheduled by a plurality of first target cells or a second cell schedules a plurality of second target cells at a time, the UE may determine a total quantity of cells according to cell configuration information, and allocate a maximum PDCCH processing capability of the UE based on the total quantity of cells and a maximum blind detection capability of the UE, so that one cell is scheduled by a plurality of cells or one cell schedules a plurality of cells at a time, thereby reducing PDCCH overheads.

In some embodiments, S112 may include the following step 1 to step 3.

Step 1: Determine scheduled cells according to the scheduling information of the plurality of configured cells, where if one first cell in the plurality of configured cells is scheduled by m first target cells, the first cell corresponds to m scheduled cells, the first target cell includes the first cell and/or another cell for scheduling the first cell, and the another cell does not include the first cell.

Step 2: Group the scheduled cells according to subcarrier spacings SCSs of scheduling cells of the scheduled cells, and determine a quantity of cells included in each SCS group.

Step 3: Determine the configured total quantity of cells according to the quantity of cells included in each SCS group.

That is, in the foregoing embodiments, when the total quantity of cells is being determined, each configured cell is considered as one scheduled cell. For a first cell scheduled by a plurality of first target cells, if m first target cells are used for scheduling the first cell, the first cell is considered as m scheduled cells. The first target cell for scheduling the first cell may be the first cell itself, that is, self-scheduling, or may be a cell other than the first cell, where m is an integer greater than 1.

For example, the network side configures N cells for the UE to perform CA, where a cell-1 is self-scheduled, and the cell-1 is scheduled by other L scheduling cells cell-2. In S120, when processing the cell-1 as a self-scheduling cell, the UE processes the cell-1 as L scheduled virtual cells vcell. The UE groups configured cells and virtual cells according to SCSs ($\mu$) of scheduling cells, and determines a size $G\mu = N_{cells}^{DL,\mu,V1}$ of each SCS group, where $G\mu$ includes a virtual cell in which an SCS of a scheduling cell is ($\mu$). If SCSs of the cell-1 and the cell-2 are different, vcells are grouped according to the SCS of the cell-2. Finally, the total quantity of cells determined by the UE is N+L.

For example, the maximum blind detection capability of CA supported by the UE is $N_{cells}^{cap}=4$. The network side configures five cells for the UE to perform CA, where an SCS of a cell-0/1 is 15 kHz, an SCS of a cell-2/3/4 is 30 kHz, the cell-0/1/2/3 is self-scheduled, the cell-4 is scheduled by the cell-3, and the cell-0 is scheduled by the cell-2 at the same time. The cell-0 may be a Pcell. When the total quantity of cells is being determined, the cell-0 is determined as a virtual cell vcell scheduled by the cell-2 in addition to a scheduled cell of self-scheduling. A quantity of cells in the group of 15 kHz ($\mu=0$) is $N_{cells}^{DL,0,V1}=2$ (including the cell-0/1), a quantity of cells in the group of 30 kHz ($\mu=1$) is $N_{cells}^{DL,1,V1}=4$ (including the cell-2/3/4 and a virtual cell scheduled by the cell-2), and the total quantity of cells is T=2+4=6.

When the maximum PDCCH processing capability of the UE is being determined, allocation of the maximum quantity of PDCCH candidates $M_{PDCCH}^{max,slot,\mu}$ of the UE is used as an example:

A maximum quantity of PDCCH candidates allocated to the group of 15 kHz ($\mu=0$) is $M_{PDCCH}^{total,slot,\mu} = \lfloor N_{cells}^{cap} \cdot M_{PDCCH}^{max,slot,\mu} \cdot N_{cells}^{DL,\mu,V1} / \Sigma_{\mu=0}^{3} N_{cells}^{DL,\mu,V1} \rfloor = \lfloor 4 \cdot 44 \cdot 2/6 \rfloor = 58$; and A maximum quantity of PDCCH candidates allocated to the group of 30 kHz ($\mu=1$) is $M_{PDCCH}^{total,slot,\mu} = \lfloor N_{cells}^{cap} \cdot M_{PDCCH}^{max,slot,\mu} \cdot N_{cells}^{DL,\mu,V1} / \Sigma_{\mu=0}^{3} N_{cells}^{DL,\mu,V1} \rfloor = \lfloor 4 \cdot 36 \cdot 4/6 \rfloor = 96$.

The total quantity of cells is determined in the foregoing embodiment. Therefore, this embodiment is easy to implement and easy to apply.

In another embodiment, S112 may include the following step 1 to step 3.

Step 1: Determine scheduled cells according to the scheduling information of the plurality of configured cells, where if one first cell in the plurality of configured cells is scheduled by P first target cells, scheduled cells corresponding to the first cell include P virtual cells, a quantity of scheduled cells corresponding to the $i^{th}$ virtual cell is $Q_i$, $Q_i$ is a scaling factor for scheduling the $i^{th}$ first target cell, the first target cell includes the first cell and another cell for scheduling the first cell, the another cell does not include the first cell, and P is an integer greater than 1.

Step 2: Group the scheduled cells according to SCSs of scheduling cells of the scheduled cells, and determining a quantity of cells included in each SCS group.

Step 3: Determine the configured total quantity of cells according to the quantity of cells included in each SCS group.

That is, in this embodiment, if one first cell is scheduled by P first target cells, the first cell is considered as P virtual cells. Different from the foregoing embodiment, in this embodiment, the quantity of scheduled cells corresponding to the $i^{th}$ virtual cell is $Q_i$ instead of 1, $Q_i$ is the scaling factor for scheduling the $i^{th}$ first target cell, and i=1, 2, . . . , P.

For example, in some embodiments, $Q_i$ is a rational number greater than 0 and less than 1. In some embodiments, $\Sigma_{i=1}^{P} Q_i = 1$. Certainly, this is not limited to thereto. In actual application, $Q_i$ may be alternatively a rational number greater than 1. This may be specifically set according to actual application.

In the foregoing embodiment, $Q_i$ may be predefined, configured by a network, or determined according to capability-related information of the terminal device.

In some embodiments, if $Q_i$ is determined according to the capability-related information of the terminal device, the method further includes: reporting, by the terminal device, the capability-related information. That is, the UE reports the capability-related information, so that the network side can determine $Q_i$ in the manner consistent with that of the UE.

In the foregoing embodiment, for example, when the maximum PDCCH processing capability is being allocated, a maximum PDCCH processing capability allocated to the $i^{th}$ virtual cell does not exceed a target maximum PDCCH processing capability, and the target maximum PDCCH processing capability is determined according to $Q_i$, for example, the target maximum PDCCH processing capability is a product of the maximum PDCCH processing capability of the UE and $Q_i$.

For example, it is assumed that the network configures N cells for the UE to perform CA, where a cell-1 is self-scheduled, and the cell-1 is scheduled by other L scheduling cells cell-2 (L is an integer greater than or equal to 1). The UE divides the cell-1 into (L+1) parts to perform grouping processing. One part is served as a partial virtual cell C0 by using the cell-1 for self-scheduling, and other L pars are served as L partial virtual cells C1 by using the cell-2 as a scheduling cell. Scaling factors configured for the partial virtual cells are respectively $Q_0, Q_1, \ldots, Q_L$.

The UE groups configured cells and partial virtual cells according to SCSs ($\mu$) of scheduling cells, and determines a size $G\mu = N_{cells}^{DL,\mu,V2}$ of each SCS group, where $G\mu$ includes a quantity $N_{cells}^{DL,\mu}$ of cells in which SCSs of scheduling cells other than the cell-1 configured by the UE are ($\mu$) and a quantity of partial virtual cells in which SCSs of scheduling cells are ($\mu$) (in some embodiments, multiplied by the foregoing scaling factor $Q_i$). SCSs of the partial virtual cells are grouped according to SCSs of scheduling cell thereof.

The UE compares a total quantity $T = \Sigma_{j=0}^{Z} N_{cells}^{DL,\mu,V2}$ of configured cells and partial virtual cells with the maximum blind detection capability $Y = N_{cells}^{cap}$ of the UE. In this case, T is the sum of quantities of cells in all SCS groups (Z is the largest supported SCS), that is, a total quantity (N−1) of cells other than the cell-1 configured by the UE+all partial virtual cells $Q_i$. If T exceeds the maximum blind detection capability of the UE, the UE determines a maximum PDCCH processing capability allocated to each SCS group: $P_{PDCCH}^{total,slot,\mu} = \lfloor N_{cells}^{cap} \cdot P_{PDCCH}^{max,slot,\mu} \cdot N_{cells}^{DL,\mu,V2} / T \rfloor$, where $P_{PDCCH}^{max,slot,\mu}$ is a maximum quantity $M_{PDCCH}^{max,slot,\mu}$ of PDCCH candidates corresponding to an SCS that is $\mu$ or a maximum quantity $C_{PDCCH}^{max,slot,\mu}$ of non-overlapping CCEs corresponding to an SCS that is $\mu$.

The maximum PDCCH processing capability allocated to each partial virtual cell does not exceed the smallest one in $P_{PDCCH}^{max,slot,\mu}$, $P_{PDCCH}^{total,slot,\mu}$, and corresponding $P_{PDCCH}^{max,slot,\mu} \times Q_i$.

For example, it is assumed that the maximum blind detection capability of CA supported by the UE is $N_{cells}^{cap}=4$. The network configures five cells for the UE to perform CA, where an SCS of a cell-0/1 is 15 kHz, an SCS of a cell-2/3/4 is 30 kHz, the cell-0/1/2/3 is self-scheduled, the cell-4 is scheduled by the cell-3, and the cell-0 is scheduled by the cell-2 at the same time.

When performing grouping in the foregoing embodiment and allocating the maximum processing capability (the maximum quantity of PDCCH candidates is used as an example), the UE divides the cell-0 into two partial cells C0 and C1, C0 is a self-scheduling partial cell, C1 is a partial cell scheduled by the cell-2, and both scaling factors Q0 and Q1 corresponding to C0 and C1 are 0.5.

A quantity of cells in the group of 15 kHz ($\mu=0$) is $N_{cells}^{DL,0,V2}=1+1\times0.5=1.5$ (including the cell-1 and Q0), a quantity of cells in the group of 30 kHz ($\mu=1$) is $N_{cells}^{DL,1,V2}=1+1+1+1\times0.5=3.5$ (including the cell-2/3/4 and Q1), and the total quantity of cells is T=1.5+3.5=5.

A maximum quantity of PDCCH candidates allocated to the group of 15 kHz ($\mu=0$) is $M_{PDCCH}^{total,slot,\mu}=\lfloor N_{cells}^{cap} \cdot M_{PDCCH}^{max,slot,\mu} \cdot N_{cells}^{DL,\mu,V2} / \Sigma_{\mu=0}^{3} N_{cells}^{DL,\mu,V2} \rfloor = \lfloor 4 \cdot 44 \cdot 1.5/5 \rfloor=52$, and a maximum quantity of PDCCH candidates allocated to the group of 30 kHz ($\mu=1$) is $M_{PDCCH}^{total,slot,\mu}=\lfloor N_{cells}^{cap} \cdot M_{PDCCH}^{max,slot,\mu} \cdot N_{cells}^{DL,\mu,V2} / \Sigma_{\mu=0}^{3} N_{cells}^{DL,\mu,V2} \rfloor = \lfloor 4 \cdot 36 \cdot 3.5/5 \rfloor=100$.

A maximum quantity of PDCCH candidates allocated to C0 does not exceed $\min\{M_{PDCCH}^{total,slot,\mu}, M_{PDCCH}^{max,slot,\mu}, M_{PDCCH}^{max,slot,\mu} \times Q_0\}=\min\{52, 44, 22\}=22$, and a maximum quantity of PDCCH candidates allocated to C1 does not exceed $\min\{M_{PDCCH}^{total,slot,\mu}, M_{PDCCH}^{max,slot,\mu}, M_{PDCCH}^{max,slot,\mu} \times Q_1\}=\min\{100, 36, 18\}=18$.

In the foregoing embodiment, a processing capability can be flexibly allocated between a plurality of scheduling cells of a same cell. In this way, relatively high scheduling flexibility is maintained, and hardware costs and energy consumption are not increased.

In still another embodiment, S112 may also include the following step 1 to step 3.

Step 1: Determine scheduled cells according to the scheduling information of the plurality of configured cells.

Step 2: Group the scheduled cells according to SCSs of scheduling cells of the scheduled cells, and determining a quantity of cells included in each SCS group, where in a grouping process, if one first cell in the plurality of configured cells is scheduled by a plurality of first target cells, the first cell serves as a scheduled cell of one of the plurality of first target cells, the first target cell includes the first cell and/or another cell for scheduling the first cell, and the another cell does not include the first cell.

Step 3: Determine the configured total quantity of cells according to the quantity of cells included in each SCS group.

That is, in this embodiment, one first cell scheduled by a plurality of first target cells serves only as a scheduled cell of one of the plurality of first target cells during grouping, and is no longer considered as a scheduled cell of another first target cell.

In the foregoing embodiment, for example, when the quantity of cells included in each SCS group is being determined, a quantity of cells for the $i^{th}$ first cell serving as a self-scheduling cell is denoted as $(1+F_i)$, where $F_i$ is a weighting factor of the first cell serving as the self-scheduling cell, i=1, 2, . . . , n, and n are a quantity of first cells serving as self-scheduling cells; and/or when the quantity of cells included in each SCS group is being determined, a quantity of cells for the $j^{th}$ first cell serving as a scheduled cell of the another cell is denoted as $(1+G_j)$, where $G_j$, is a weighting factor of the first cell serving as the scheduled cell of the another cell, j=1, 2, . . . , m, and m is a quantity of first cells serving as the scheduled cell of the another cell. In other words, when the first cell is scheduled by the plurality of first target cells, if the plurality of first target cells include the first cell (that is, the first cell is a self-scheduling cell), and the first cell is served as a scheduled cell of the first cell, one weighting factor $F_i$ may be added during calculation of the quantity of cells, and if the first cell is served as ae scheduled cell of a cell other than the first cell, one weighting factor $G_j$ may be added during calculation of the quantity of cells.

In the foregoing embodiment, each of $F_i$ and/or $G_j$ is a rational number greater than 0 and less than 1.

$F_i$ and/or $G_j$ may be predefined, configured by a network, or determined according to capability-related information of the terminal device.

If $F_i$ and/or $G_j$ are/is determined according to the capability-related information of the terminal device, the method further includes: reporting, by the terminal device, the capability-related information, where $F_i$ and/or $G_j$ may be a capability value directly reported by the UE, or may be obtained through calculation according to one or more capability values reported by the UE.

It should be noted that in the foregoing embodiment, the quantity of cells for the $i^{th}$ first cell serving as the self-scheduling cell is denoted as $(1+F_i)$, and the quantity of cells for the $j^{th}$ first cell serving as the scheduled cell of the another cell is denoted as $(1+G_j)$. In actual application, the quantity of cells for the $i^{th}$ first cell serving as the self-scheduling cell may be directly denoted as $F_i$, and the quantity of cells for the $j^{th}$ first cell serving as the scheduled cell of the another cell is denoted as $G_j$, which are specifically related to values of $F_i$ and $G_j$.

In the foregoing embodiment, when the maximum PDCCH processing capability of the UE is being allocated:

a maximum PDCCH processing capability allocated to the $i^{th}$ first cell serving as the self-scheduling cell does not exceed a first target maximum PDCCH processing capability, and the first target maximum PDCCH processing capability is determined according to $F_i$, for example, the first target maximum PDCCH processing capability is a product of the maximum PDCCH processing capability of the UE and $(1+F_i)$; and a maximum PDCCH processing capability allocated to the $j^{th}$ first cell serving as the scheduled cell of the another cell does not exceed a second target maximum PDCCH processing capability, and the second target maximum PDCCH processing capability is determined according to $G_j$, for example, the second target maximum PDCCH processing capability is a product of the maximum PDCCH processing capability of the UE and $(1+G_j)$.

For example, the network configures N cells for the UE to perform CA, where a cell-1 is self-scheduled, and the cell-1 is scheduled by other L scheduling cells cell-2 (L is an integer greater than or equal to 1). The UE processes the cell-1 as a self-scheduling cell or as a scheduled cell of a scheduling cell of the cell-2.

The UE groups configured cells according to SCSs ($\mu$) of scheduling cells, and determines a size $N_{cells}^{DL,\mu,V3}$ of each SCS group. In some embodiments, L scheduling cells cell-2 may be weighted (for example, plus or multiplied by a weight $G_j$), or a scheduled cell cell-1 is weighted (for example, plus or multiplied by a weight $F_i$).

The UE compares a total quantity $T=\Sigma_{\mu=0}^{Z} N_{cells}^{DL,\mu,V3}$ of cells with the maximum blind detection capability $Y=N_{cells}^{cap}$ of the UE. T is the sum of quantities of cells in all SCS groups (Z is the largest supported SCS).

If T exceeds the maximum blind detection capability of the UE, the UE determines the maximum PDCCH processing capability: $P_{PDCCH}^{total,slot,\mu}=\lfloor N_{cells}^{cap} \cdot P_{PDCCH}^{max,slot,\mu} \cdot N_{cells}^{DL,\mu,V3}/T \rfloor$, where $P_{PDCCH}^{max,slot,\mu}$ may be $M_{PDCCH}^{max,slot,\mu}$ or $C_{PDCCH}^{max,slot,\mu}$.

A maximum PDCCH processing capability of each cell does not exceed the smallest in $P_{PDCCH}^{max,slot,\mu}$, $P_{PDCCH}^{total,slot,\mu}$, and corresponding $P_{PDCCH}^{max,slot,\mu} \times (1+F_i)$ or $P_{PDCCH}^{max,slot,\mu} \times (1+G_j)$.

For example, the maximum blind detection capability of CA supported by the UE is $N_{cells}^{cap}=4$. The network side configures five cells for the UE to perform CA, where an SCS of a cell-0/1 is 15 kHz, an SCS of a cell-213/4 is 30 kHz, the cell-01112/3 is self-scheduled, the cell-4 is scheduled by the cell-3, and the cell-0 is scheduled by the cell-2 at the same time.

When the UE performs grouping in the foregoing embodiment and allocates the maximum processing capability (the maximum quantity of PDCCH candidates is used as an example), the cell-0 is served as a self-scheduling cell for processing, and a weight F=1.2 of the cell-2 is obtained.

A quantity of cells in the group of 15 kHz ($\mu=0$) is $N_{cells}^{DL,0,V3}=2$ (including the cell-0/1), a quantity of cells in the group of 30 kHz ($\mu=1$) is $N_{cells}^{DL,1,V3}=1\times 1.2+1+1=3.2$ (including the cell-2/3/4), and the total quantity of cells is T=2+3.2=5.2.

A maximum quantity of PDCCH candidates allocated to the group of 15 kHz ($\mu=0$) is $M_{PDCCH}^{total,slot,\mu}=\lfloor N_{cells}^{cap} \cdot M_{PDCCH}^{max,slot,\mu} \cdot N_{cells}^{DL,\mu,V3}/\Sigma_{\mu=0}^{3} N_{cells}^{DL,\mu,V3} \rfloor = \lfloor 4 \cdot 44 \cdot 2/5.2 \rfloor = 67$, and a maximum quantity of PDCCH candidates allocated to the group of 30 kHz ($\mu=1$) is $M_{PDCCH}^{total,slot,\mu}=\lfloor N_{cells}^{cap} \cdot M_{PDCCH}^{max,slot,\mu} \cdot N_{cells}^{DL,\mu,V3}/\Sigma_{\mu=0}^{3} N_{cells}^{DL,\mu,V3} \rfloor = \lfloor 4 \cdot 36 \cdot 3.2/5.2 \rfloor = 88$.

In the foregoing embodiment, processing capabilities of different cells are not dynamically shared, which is actually simple to implement, but may lead to a decrease in a quantity of candidates that can be monitored in some cells, and waste a monitoring capability of another cell.

In still another embodiment, S112 may also include the following step 1 to step 3.

Step 1: Determine scheduled cells according to the scheduling information of the plurality of configured cells, where if one second cell in the plurality of configurations cells schedules a plurality of second target cells at a time, the plurality of second target cells serve as one scheduled cell.

Step 2: Group the scheduled cells according to SCSs of scheduling cells of the scheduled cells, and determining a quantity of cells included in each SCS group.

Step 3: Determine the configured total quantity of cells according to the quantity of cells included in each SCS group.

In this embodiment, for a second cell that schedules a plurality of second target cells at a time, the plurality of second target cells are used as only one scheduled cell.

A manner in which the second cell schedules the plurality of second target cells at a time may be that the plurality of second target cells are simultaneously scheduled by using a predetermined DCI format.

For example, the network configures N cells for the UE to perform CA, where a cell-1 is not self-scheduled, and is scheduled only by using a cell-2. For example, the cell-2 simultaneously schedules the cell-1 and the cell-2 by using a special DCI format. In this case, the cell-1 may be used as a virtual cell vcell-1 and is not included a total quantity of cells in any group.

In some embodiments, the UE groups configured cells according to SCSs ($\mu$) of scheduling cells, and determines a size $G\mu=N_{cells}^{DL,\mu,V4}$ of each SCS group, where $G\mu$ includes G only a quantity of cells in which an SCS of a scheduling cell is ($\mu$) and a scheduled cell does not include the foregoing virtual cell vcell-1.

The UE compares a total quantity $T=\Sigma_{\mu=0}^{Z} N_{cells}^{DL,\mu,V4}$ of (configured and virtual) cells with the maximum blind detection capability $Y=N_{cells}^{cap}$ of the UE. In this case, T is the sum of quantities of cells in all SCS groups (Z is the largest supported SCS), that is, a total quantity N of cells configured by the UE—a quantity of (one or more) virtual cells.

If T exceeds the maximum blind detection capability Y of the UE, the UE determines a maximum PDCCH processing capability corresponding to each SCS: $P_{PDCCH}^{total,slot,\mu}=\lfloor N_{cells}^{cap} \cdot P_{PDCCH}^{max,slot,\mu} \cdot N_{cells}^{DL,\mu,V4}/T \rfloor$, where $P_{PDCCH}^{max,slot,\mu}$ may be $M_{PDCCH}^{max,slot,\mu}$ or $C_{PDCCH}^{max,slot,\mu}$.

For example, it is assumed that the maximum blind detection capability of CA supported by the UE is $N_{cells}^{cap}=4$. The network side configures six cells for the UE to perform CA, where an SCS of a cell-0/1/5 is 15 kHz, an SCS of a cell-2/3/4 is 30 kHz, the cell-0/1/2/3 is self-scheduled, the cell-4 is scheduled by the cell-3, and the cell-0 may simultaneously schedule the cell-0 and the cell-5 by using a DCI format X. When the UE performs grouping in the foregoing embodiment and allocates the maximum processing capability (the maximum quantity of PDCCH candidates is used as an example), the cell-5 is used as a virtual cell and is not included a total quantity of cells in any group, that is, only the cell-0 in the cell-0 and the cell-5 that are simultaneously scheduled by the cell-0 is used as a scheduled cell of the cell-0.

A quantity of cells in the group of 15 kHz ($\mu=0$) is $N_{cells}^{DL,0,V4}=2$ (including the cell-0/1), a quantity of cells in the group of 30 kHz ($\mu=1$) is $N_{cells}^{DL,1,V4}=1+1+1=3$ (including the cell-2/3/4), and the total quantity of cells is T=2+3=5.

A maximum quantity of PDCCH candidates allocated to the group of 15 kHz ($\mu=0$) is $M_{PDCCH}^{total,slot,\mu}=\lfloor N_{cells}^{cap} \cdot M_{PDCCH}^{max,slot,\mu} \cdot N_{cells}^{DL,\mu,V4}/\Sigma_{\mu=0}^{3} N_{cells}^{DL,\mu,V4} \rfloor = \lfloor 4 \cdot 44 \cdot 2/5 \rfloor = 70$, and a maximum quantity of PDCCH candidates allocated to the group of 30 kHz ($\mu=1$) is $M_{PDCCH}^{total,slot,\mu}=\lfloor N_{cells}^{cap} \cdot M_{PDCCH}^{max,slot,\mu} \cdot N_{cells}^{DL,\mu,V4}/\Sigma_{\mu=0}^{3} N_{cells}^{DL,\mu,V4} \rfloor = \lfloor 4 \cdot 36 \cdot 3/5 \rfloor = 86$.

In the foregoing embodiment, a PDCCH processing capability of a scheduling cell is reused to schedule a plurality of multiple scheduled cells, so that more scheduled cells can be supported without increasing a PDCCH hardware processing capability.

In the foregoing embodiment, the UE may report the maximum blind detection capability of the UE, so that the network side and the UE have a same understanding of the maximum blind detection capability of the UE.

Figure 2:
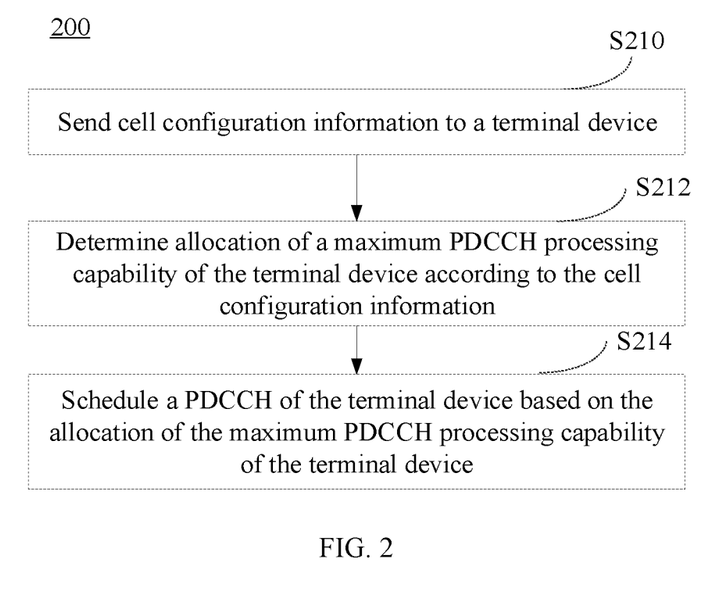
FIG. 2 is a schematic flowchart of a PDCCH transmission method according to an embodiment of the present disclosure.

FIG. 2 is another schematic flowchart of a PDCCH transmission method according to an embodiment of the present disclosure. A method 200 may be performed by a network device. In other words, the method may be performed by software or hardware installed in the network device. As shown in FIG. 2, the method may include the following steps.

S210. Send cell configuration information to a terminal device, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells.

In this embodiment of the present disclosure, the cell configuration information is the same as the cell configuration information in the method 100. For details, refer to the related descriptions in the method 100. Details are not described herein again.

In some embodiments, before S210, the method may further include: receiving reported capability-related information of the terminal device. The capability-related information includes but is not limited to at least one of the following: a maximum blind detection capability of the terminal device, and $Q_i$, $F_i$, or capability-related information of $Q_i$ in some embodiments of the method 100.

S212. Determine allocation of a maximum PDCCH processing capability of the terminal device according to the cell configuration information.

In this embodiment of the present disclosure, the network device may determine the allocation of the maximum PDCCH processing capability of the terminal device in the manner corresponding to the terminal device. For details, refer to the descriptions in the method 100. Details are not described herein again.

In some embodiments, the method may further include: sending configuration information to the terminal device. The configuration information is used to configure at least one of the following:

(1) a scaling factor of each virtual cell corresponding to the first cell scheduled by the plurality of first target cells, for example, $Q_i$ in one embodiment of method 100;

(2) a weighting factor of the first cell, serving as a self-scheduling cell, scheduled by the plurality of first target cells, for example, $F_i$ in one embodiment of method 100; and (3) a weighting factor of the first cell, serving as a scheduled cell of another cell, scheduled by the plurality of first target cells, for example, $G_i$ in one embodiment of method 100.

S214. Schedule a PDCCH of the terminal device based on the allocation of the maximum PDCCH processing capability of the terminal device.

In this embodiment of the present disclosure, after the allocation of the maximum PDCCH processing capability of the UE is determined in S212, a PDCCH of the UE is scheduled according to a maximum PDCCH processing capability allocated to each SCS group.

According to the PDCCH transmission method provided in this embodiment of the present disclosure, one cell can be scheduled by another cell at the same time of self-scheduling, UE may monitor scheduling of DCI of a PCell and a SCell to the PCell, a scheduling cell and a scheduled cell may have different SCSs, and a maximum quantity of PDCCH candidates for blind detection by the UE, a maximum quantity of non-overlapping CCEs, and the like are allocated to scheduling cells, thereby simplifying implementation of the UE and reducing power consumption.

Figure 3:
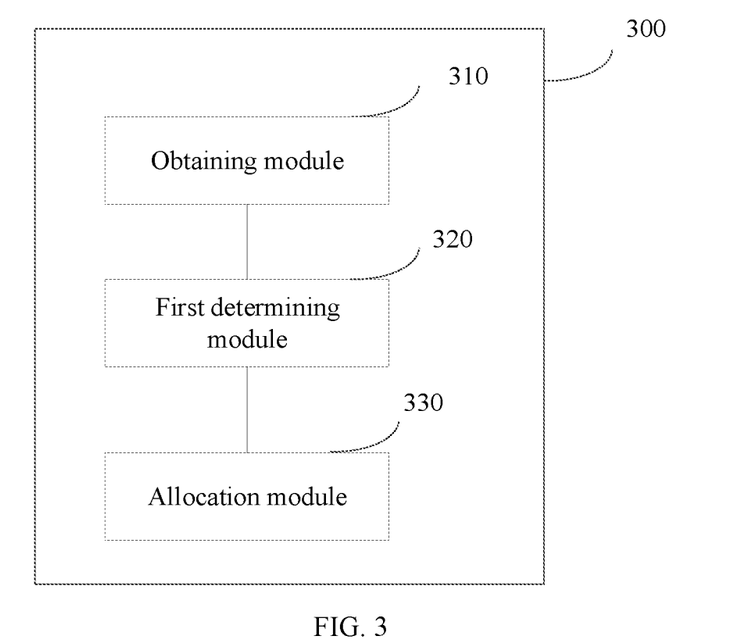
FIG. 3 is a schematic structural diagram of a terminal device according to an embodiment of the present disclosure.

FIG. 3 is a schematic structural diagram of a terminal device according to an embodiment of the present disclosure. As shown in FIG. 3, a terminal device 300 includes: an obtaining module 310, configured to obtain cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; a first determining module 320, configured to determine a total quantity of cells according to the cell configuration information; and an allocation module 330, configured to allocate a maximum physical downlink control channel PDCCH processing capability of the terminal device based on the total quantity of cells and a maximum blind detection capability of the terminal device.

In some embodiments, the determining a total quantity of cells according to the cell configuration information includes: determining scheduled cells according to the scheduling information of the plurality of configured cells, where if one first cell in the plurality of configured cells is scheduled by m first target cells, the first cell corresponds to m scheduled cells, the first target cell includes the first cell and/or another cell for scheduling the first cell, and the another cell does not include the first cell; grouping the scheduled cells according to subcarrier spacings SCSs of scheduling cells of the scheduled cells, and determining a quantity of cells included in each SCS group; and determining the configured total quantity of cells according to the quantity of cells included in each SCS group.

In some embodiments, the determining a total quantity of cells according to the cell configuration information includes: determining scheduled cells according to the scheduling information of the plurality of configured cells, where if one first cell in the plurality of configured cells is scheduled by P first target cells, scheduled cells corresponding to the first cell include P virtual cells, a quantity of scheduled cells corresponding to the $i^{th}$ virtual cell is $Q_i$, $Q_i$ is a scaling factor for scheduling the $i^{th}$ first target cell, the first target cell includes the first cell and another cell for scheduling the first cell, and the another cell does not include the first cell; grouping the scheduled cells according to SCSs of scheduling cells of the scheduled cells, and determining a quantity of cells included in each SCS group; and determining the configured total quantity of cells according to the quantity of cells included in each SCS group.

In some embodiments, $Q_i$ is a rational number greater than 0 and less than 1.

In some embodiments, $\Sigma_{i=1}^{P} Q_i = 1$. In some embodiments, $Q_i$ is predefined, configured by a network, or determined according to capability-related information of the terminal device.

In some embodiments, the terminal device further includes: a first sending module, configured to: if $Q_i$ is determined according to the capability-related information of the terminal device, report the capability-related information.

In some embodiments, a maximum PDCCH processing capability allocated to the $i^{th}$ virtual cell does not exceed a target maximum PDCCH processing capability, and the target maximum PDCCH processing capability is determined according to $Q_i$.

In some embodiments, the determining a total quantity of cells according to the cell configuration information includes: determining scheduled cells according to the scheduling information of the plurality of configured cells; grouping the scheduled cells according to SCSs of scheduling cells of the scheduled cells, and determining a quantity of cells included in each SCS group, where in a grouping process, if one first cell in the plurality of configured cells is scheduled by a plurality of first target cells, the first cell serves as a scheduled cell of one of the plurality of first target cells, the first target cell includes the first cell and/or another cell for scheduling the first cell, and the another cell does not include the first cell; and determining the configured total quantity of cells according to the quantity of cells included in each SCS group.

In some embodiments, when the quantity of cells included in each SCS group is being determined, a quantity of cells for the $i^{th}$ first cell serving as a self-scheduling cell is denoted as $(1+F_i)$, where $F_i$ is a weighting factor of the first cell serving as the self-scheduling cell, i=1, 2, . . . , n, and n are a quantity of first cells serving as self-scheduling cells; and/or when the quantity of cells included in each SCS group is being determined, a quantity of cells for the $j^{th}$ first cell serving as a scheduled cell of the another cell is denoted as $(1+G_j)$, where $G_j$ is a weighting factor of the first cell serving as the scheduled cell of the another cell, j=1, 2, . . . , m, and m is a quantity of first cells serving as the scheduled cell of the another cell.

In some embodiments, each of $F_i$ and/or $G_j$ is a rational number greater than 0 and less than 1.

In some embodiments, $F_i$ and/or $G_j$ are/is predefined, configured by a network, or determined according to capability-related information of the terminal device.

In some embodiments, the terminal device further includes: a second sending module, configured to: if $F_i$ and/or $G_j$ are/is determined according to the capability-related information of the terminal device, report the capability-related information.

In some embodiments, a maximum PDCCH processing capability allocated to the $i^{th}$ first cell serving as the self-scheduling cell does not exceed a first target maximum PDCCH processing capability, and the first target maximum PDCCH processing capability is determined according to $F_i$; and a maximum PDCCH processing capability allocated to the $j^{th}$ first cell serving as the scheduled cell of the another cell does not exceed a second target maximum PDCCH processing capability, and the second target maximum PDCCH processing capability is determined according to $G_j$.

In some embodiments, the determining a total quantity of cells according to the cell configuration information includes: determining scheduled cells according to the scheduling information of the plurality of configurations cells, where if one second cell in the plurality of configurations cells schedules a plurality of second target cells at a time, the plurality of second target cells serve as one scheduled cell; grouping the scheduled cells according to SCSs of scheduling cells of the scheduled cells, and determining a quantity of cells included in each SCS group; and determining the configured total quantity of cells according to the quantity of cells included in each SCS group.

In some embodiments, the second cell simultaneously schedules the plurality of second target cells by using a predetermined downlink control information DCI format.

In some embodiments, the determining a maximum physical downlink control channel PDCCH processing capability of the terminal device based on the total quantity of cells and a maximum blind detection capability of the terminal device includes:

if the total quantity of cells is greater than the maximum blind detection capability, allocating the maximum PDCCH processing capability of the terminal device among the SCS groups according to a ratio of the quantity of cells included in each SCS group to the total quantity of cells.

The terminal device provided in this embodiment of the present disclosure can implement the processes implemented by the terminal device in the method embodiments in FIG. 1 to FIG. 2 and a same effect can be achieved. To avoid repetition, details are not described herein again.

Figure 4:
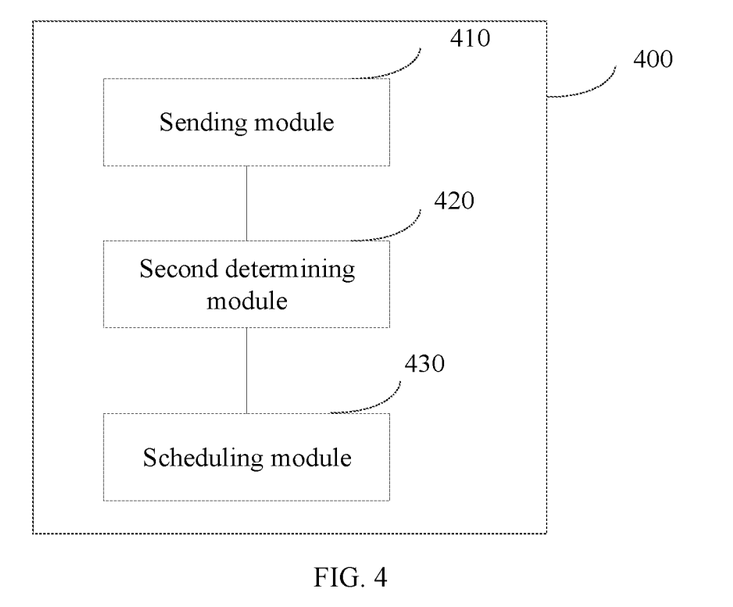
FIG. 4 is a schematic structural diagram of a network device according to an embodiment of the present disclosure.

FIG. 4 is a schematic structural diagram of a network device according to an embodiment of the present disclosure. As shown in FIG. 4, a network device 400 includes: a sending module 410, configured to send cell configuration information to a terminal device, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; a second determining module 420, configured to determine allocation of a maximum PDCCH processing capability of the terminal device according to the cell configuration information; and a scheduling module 430, configured to schedule a PDCCH of the terminal device based on the allocation of the maximum PDCCH processing capability of the terminal device.

In some embodiments, the sending module 410 is further configured to send configuration information to the terminal device, where the configuration information is used to configure at least one of the following: a scaling factor of each virtual cell corresponding to the first cell scheduled by the plurality of first target cells; a weighting factor of the first cell, serving as a self-scheduling cell, scheduled by the plurality of first target cells; and a weighting factor of the first cell, serving as a scheduled cell of another cell, scheduled by the plurality of first target cells.

In some embodiments, the network device further includes: a receiving module, configured to: before the configuration information is sent to the terminal device, receive reported capability-related information of the terminal device.

The network device provided in this embodiment of the present disclosure can implement the processes implemented by the network side or the network device in the method embodiments in FIG. 1 to FIG. 2 and a same effect can be achieved. To avoid repetition, details are not described herein again.

Figure 5:
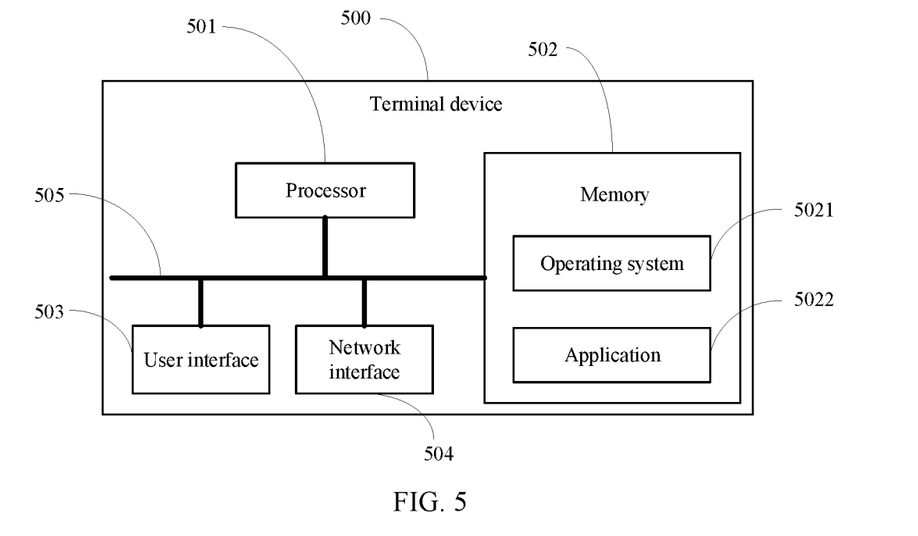
FIG. 5 is a schematic structural diagram of another terminal device according to an embodiment of the present disclosure.

FIG. 5 is a block diagram of a terminal device according to another embodiment of the present disclosure. A terminal device 500 shown in FIG. 5 includes at least one processor 501, a memory 502, at least one network interface 504, and a user interface 503. All components of the terminal device 500 are coupled together by using the bus system 505. It can be understood that the bus system 505 is configured to implement a connection and communication between these components. In addition to a data bus, the bus system 505 may include a power bus, a control bus, and a status signal bus. However, for clear description, various types of buses in FIG. 5 are marked as the bus system 505.

The user interface 503 may include a display, a keyboard, or a clicking device (for example, a mouse, a trackball), a touch panel, or a touchscreen.

It can be understood that the memory 502 in this embodiment of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM, ESDRAM), a Synch Link DRAM (SLDRAM), and a Direct Rambus RAM (DRRAM). The memory 502 in the system and the method that are described in the embodiments of the present disclosure is to include but is not limited to these memories and a memory of any other proper type.

In some embodiments, the memory 502 stores the following element, an executable module or a data structure, or a subset thereof, or an extension set thereof: an operating system 5021 and an application 5022.

The operating system 5021 includes various system programs, for example, a framework layer, a kernel library layer, and a driver layer, and is configured to implement various basic services and process hardware-based tasks. The application 5022 includes various applications, for example, a media player, and a browser, to implement various application services. A program for implementing the method in the embodiments of the present disclosure may be included in the application 5022.

In this embodiment of the present disclosure, the terminal device 500 further includes a computer program that is stored in the memory 502 and that can be run on the processor 501, and when the computer program is executed by the processor 501, the following steps are implemented:

obtaining cell configuration information, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells;

determining a total quantity of cells according to the cell configuration information; and allocating a maximum PDCCH processing capability of the terminal device based on the total quantity of cells and a maximum blind detection capability of the terminal device.

The method disclosed in the foregoing embodiment of the present disclosure may be applied to the processor 501, or implemented by the processor 501. The processor 501 may be an integrated circuit chip and has a signal processing capability. During embodiment, each step of the foregoing method may be completed by using an integrated logic circuit of hardware in the processor 501 or an instruction in a form of software. The processor 501 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 502, and the processor 501 reads information in the memory 502 and completes the steps in the foregoing method in combination with hardware of the processor 501. Specifically, the computer-readable storage medium stores a computer program, and when the computer program is executed by the processor 501, the steps of the foregoing method 100 are implemented.

It can be understood that the embodiments described in the embodiments of the present disclosure may be implemented by hardware, software, firmware, middleware, microcode, or a combination thereof. For hardware embodiment, a processing unit may be implemented in one or more Application Specific Integrated Circuits (ASIC), Digital Signal Processing (DSP), DSP Device (DSPD), Programmable Logic Device (PLD), Field-Programmable Gate Array (FPGA), general purpose processors, controllers, microcontrollers, microprocessors, or other electronic units or a combination thereof used to perform the functions in the present disclosure.

For software embodiment, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The terminal device 500 can implement the processes implemented by the terminal device in FIG. 1 to FIG. 2. To avoid repetition, details are not described herein again.

Figure 6:
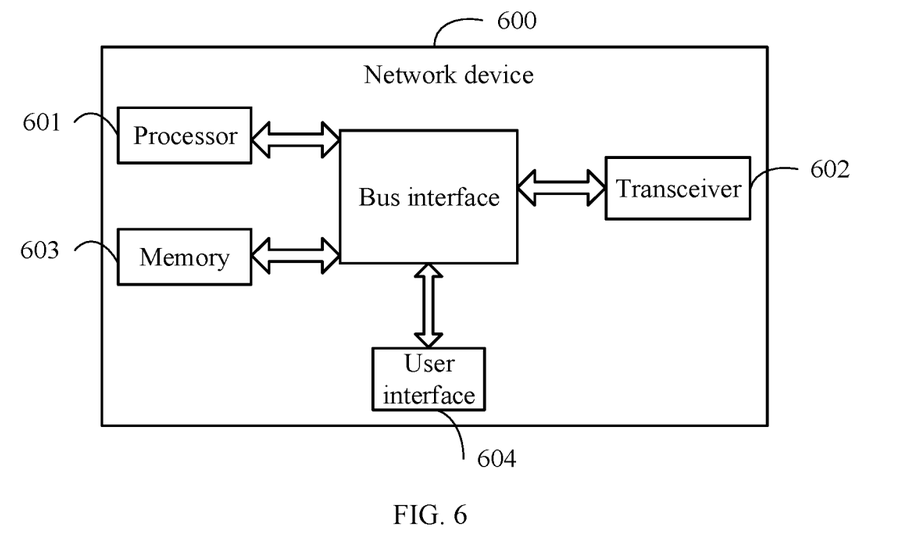
FIG. 6 is a schematic structural diagram of another network device according to an embodiment of the present disclosure.

Referring to FIG. 6, FIG. 6 is a structural diagram of a network device according to an embodiment of the present disclosure, which can be used as a network side or a network device to implement details of the method 100 to 200, and achieve a same effect. As shown in FIG. 6, a network device 600 includes a processor 601, a transceiver 602, a memory 603, a user interface 604, and a bus interface.

In this embodiment of the present disclosure, the network device 600 further includes a computer program that is stored in the memory 603 and that can be run on the processor 601. When the computer program is executed by the processor 601, the following steps are implemented: sending cell configuration information to a terminal device, where the cell configuration information indicates a plurality of configured cells and scheduling information of the plurality of configured cells, the plurality of configured cells include a plurality of cells configured for the terminal device for carrier aggregation, the scheduling information indicates that one first cell is scheduled by a plurality of first target cells, and/or the scheduling information indicates that one second cell schedules a plurality of second target cells at a time, and the first cell, the second cell, the first target cell, and the second target cell are cells in the plurality of configured cells; determining allocation of a maximum PDCCH processing capability of the terminal device according to the cell configuration information; and scheduling a PDCCH of the terminal device based on the allocation of the maximum PDCCH processing capability of the terminal device.

In FIG. 6, a bus architecture may include any quantity of interconnected buses and bridges. Specifically, various circuits of one or more processors represented by the processor 601 and a memory represented by the memory 603 are interconnected. The bus architecture may further link various other circuits such as a peripheral device, a voltage regulator, and a power management circuit. These are well known in the art, and therefore are not further described in this specification. A bus interface provides an interface. The transceiver 602 may be a plurality of components. To be specific, the transceiver 602 includes a transmitter and a receiver, and provides a unit configured to communicate with various other apparatuses on a transmission medium. For different user equipment, a user interface 604 may be an interface that can externally or internally connect to a needed device, and the connected device includes but is not limited to a keypad, a display, a loudspeaker, a microphone, and a joystick.

The processor 601 is responsible for bus architecture management and general processing. The memory 603 may store data used by the processor 601 when the processor 601 performs an operation.

The network device 600 can implement the processes implemented by the network side or the network device in FIG. 1 to FIG. 2 and achieve a same effect. To avoid repetition, details are not described herein again.

An embodiment of the present disclosure further provides a computer-readable storage medium. The computer-readable storage medium stores a computer program, and when the computer program is executed by a processor, the processes performed by the network device or the terminal device in the embodiments shown in FIG. 1 to FIG. 2 are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing embodiments, a person skilled in the art may clearly understand that the method in the foregoing embodiment may be implemented by software in addition to a necessary universal hardware platform or by hardware only. Based on such an understanding, the technical solutions of the present disclosure may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific embodiments, and the above specific embodiments are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A maximum Physical Downlink Control CHannel (PDCCH) processing capability allocation method, performed by a terminal device, wherein the method comprises:
  obtaining cell configuration information, wherein the cell configuration information indicates a plurality of configured cells and scheduling information of the plurality of configured cells, the plurality of configured cells comprise a plurality of cells configured for the terminal device for carrier aggregation, the scheduling information indicates that a first cell is scheduled by a plurality of first target cells, and the first cell and the plurality of first target cells are cells in the plurality of configured cells, wherein the first cell is a primary cell;
  determining a total quantity of cells according to the cell configuration information; and
  allocating a maximum PDCCH processing capability of the terminal device based on the total quantity of cells and a maximum blind detection capability of the terminal device,
  wherein determining the total quantity of cells according to the cell configuration information comprises:
    determining scheduled cells according to the scheduling information of the plurality of configured cells;
    grouping the scheduled cells according to SubCarrier Spacings (SCSs) of scheduling cells of the scheduled cells, and determining a quantity of cells comprised in each SCS group, wherein in a grouping process, when the first cell in the plurality of configured cells is scheduled by the plurality of first target cells, the first cell serves as a scheduled cell of one of the plurality of first target cells, the plurality of first target cells comprise the first cell and another cell for scheduling the first cell, and the another cell does not comprise the first cell; and
    determining the total quantity of cells according to the quantity of cells comprised in each SCS group.

2. The method according to claim 1, wherein determining the total quantity of cells according to the cell configuration information comprises:
  determining the scheduled cells according to the scheduling information of the plurality of configured cells, wherein when the first cell in the plurality of configured cells is scheduled by m first target cells, the first cell corresponds to m scheduled cells, the plurality of first target cells comprise the first cell or another cell for scheduling the first cell, and the another cell does not comprise the first cell;
  grouping the scheduled cells according to the SCSs of scheduling cells of the scheduled cells, and determining the quantity of cells comprised in each SCS group; and
  determining the total quantity of cells according to the quantity of cells comprised in each SCS group.

3. The method according to claim 1, wherein determining the total quantity of cells according to the cell configuration information comprises:
- determining the scheduled cells according to the scheduling information of the plurality of configured cells, wherein when the first cell in the plurality of configured cells is scheduled by P first target cells, scheduled cells corresponding to the first cell comprise P virtual cells, a quantity of scheduled cells corresponding to an $i^{th}$ virtual cell is $Q_i$, $Q_i$ is a scaling factor for scheduling an $i^{th}$ first target cell, the plurality of first target cells comprise the first cell and another cell for scheduling the first cell, and the another cell does not comprise the first cell;
- grouping the scheduled cells according to the SCSs of scheduling cells of the scheduled cells, and determining the quantity of cells comprised in each SCS group; and
- determining the total quantity of cells according to the quantity of cells comprised in each SCS group.

4. The method according to claim 1, wherein
- when the quantity of cells comprised in each SCS group is being determined, a quantity of cells for an $i^{th}$ first cell serving as a self-scheduling cell is denoted as $(1+F_i)$, wherein $F_i$ is a weighting factor of the first cell serving as the self-scheduling cell, i=1, 2 . . . , n, and n indicates a quantity of first cells serving as self-scheduling cells; or
- when the quantity of cells comprised in each SCS group is being determined, a quantity of cells for an $j^{th}$ first cell serving as a scheduled cell of the another cell is denoted as $(1+G_j)$, wherein $G_j$ is a weighting factor of the first cell serving as the scheduled cell of the another cell, j=1, 2, . . . , m, and m is a quantity of first cells serving as the scheduled cell of the another cell.

5. The method according to claim 4, wherein each of $F_i$ or $G_j$ is a rational number greater than 0 and less than 1.

6. The method according to claim 4, wherein $F_i$ or $G_j$ is predefined, configured by a network, or determined according to capability-related information of the terminal device.

7. The method according to claim 6, wherein when $F_i$ or $G_j$ is determined according to the capability-related information of the terminal device, the method further comprises:
- reporting, by the terminal device, the capability-related information.

8. The method according to claim 4, wherein
- a maximum PDCCH processing capability allocated to the $i^{th}$ first cell serving as the self-scheduling cell does not exceed a first target maximum PDCCH processing capability, and the first target maximum PDCCH processing capability is determined according to $F_i$; and
- a maximum PDCCH processing capability allocated to the $j^{th}$ first cell serving as the scheduled cell of the another cell does not exceed a second target maximum PDCCH processing capability, and the second target maximum PDCCH processing capability is determined according to $G_j$.

9. The method according to claim 1, wherein the scheduling information indicates that a second cell schedules a plurality of second target cells at a time, wherein determining the total quantity of cells according to the cell configuration information comprises:
- determining the scheduled cells according to the scheduling information of the plurality of configurations cells, wherein when the second cell in the plurality of configured cells schedules the plurality of second target cells at the time, the plurality of second target cells serve as one scheduled cell;
- grouping the scheduled cells according to the SCSs of scheduling cells of the scheduled cells, and determining the quantity of cells comprised in each SCS group; and
- determining the total quantity of cells according to the quantity of cells comprised in each SCS group.

10. The method according to claim 9, wherein the second cell simultaneously schedules the plurality of second target cells by using a predetermined Downlink Control Information (DCI) format.

11. The method according to claim 1, wherein the allocating a maximum PDCCH processing capability of the terminal device based on the total quantity of cells and a maximum blind detection capability of the terminal device comprises:
- when the total quantity of cells is greater than the maximum blind detection capability, allocating the maximum PDCCH processing capability of the terminal device among the SCS groups according to a ratio of the quantity of cells comprised in each SCS group to the total quantity of cells.

12. A Physical Downlink Control CHannel (PDCCH) transmission method, performed by a network device, wherein the method comprises:
- sending cell configuration information to a terminal device, wherein the cell configuration information indicates a plurality of configured cells and scheduling information of the plurality of configured cells, the plurality of configured cells comprise a plurality of cells configured for the terminal device for carrier aggregation, the scheduling information indicates that a first cell is scheduled by a plurality of first target cells, and the first cell and the plurality of first target cells are cells in the plurality of configured cells, wherein the first cell is a primary cell, wherein a total quantity of cells is determined according to the cell configuration information;
- determining allocation of a maximum PDCCH processing capability of the terminal device according to the total quantity of cells and a maximum blind detection capability of the terminal device; and
- scheduling a PDCCH of the terminal device based on the allocation of the maximum PDCCH processing capability of the terminal device,
- wherein the total quantity of cells is determined according to the cell configuration information at least by:
- determining scheduled cells according to the scheduling information of the plurality of configured cells;
- grouping the scheduled cells according to SubCarrier Spacings (SCSs) of scheduling cells of the scheduled cells, and determining a quantity of cells comprised in each SCS group, wherein in a grouping process, when the first cell in the plurality of configured cells is scheduled by the plurality of first target cells, the first cell serves as a scheduled cell of one of the plurality of first target cells, the plurality of first target cells comprise the first cell and another cell for scheduling the first cell, and the another cell does not comprise the first cell; and
- determining the total quantity of cells according to the quantity of cells comprised in each SCS group.

13. The method according to claim 12, wherein the method further comprises: sending configuration information to the terminal device, wherein the configuration information is used to configure at least one of the following:
- a scaling factor of each virtual cell corresponding to the first cell scheduled by the plurality of first target cells;

a weighting factor of the first cell, serving as a self-scheduling cell, scheduled by the plurality of first target cells; or a weighting factor of the first cell, serving as a scheduled cell of another cell, scheduled by the plurality of first target cells.

14. The method according to claim 13, wherein before the sending configuration information to the terminal device, the method further comprises:

receiving reported capability-related information of the terminal device.

15. A network device, comprising a memory, a processor, and a computer program that is stored in the memory and that can be run on the processor, wherein when the computer program is executed by the processor, the method according to claim 12 is implemented.

16. A terminal device, comprising:

a memory for storing computer-readable instructions;

a processor coupled to the memory and configured to execute the computer-readable instructions, wherein the computer-readable instructions, when executed by the processor, cause the processor to perform operations comprising:

obtaining cell configuration information, wherein the cell configuration information indicates a plurality of configured cells and scheduling information of the plurality of configured cells, the plurality of configured cells comprise a plurality of cells configured for the terminal device for carrier aggregation, the scheduling information indicates that a first cell is scheduled by a plurality of first target cells, and the first cell and the plurality of first target cells are cells in the plurality of configured cells, wherein the first cell is a primary cell;

determining a total quantity of cells according to the cell configuration information; and allocating a maximum PDCCH processing capability of the terminal device based on the total quantity of cells and a maximum blind detection capability of the terminal device, wherein determining the total quantity of cells according to the cell configuration information comprises:

determining scheduled cells according to the scheduling information of the plurality of configured cells;

grouping the scheduled cells according to SubCarrier Spacings (SCSs) of scheduling cells of the scheduled cells, and determining a quantity of cells comprised in each SCS group, wherein in a grouping process, when the first cell in the plurality of configured cells is scheduled by the plurality of first target cells, the first cell serves as a scheduled cell of one of the plurality of first target cells, the plurality of first target cells comprise the first cell and another cell for scheduling the first cell, and the another cell does not comprise the first cell; and determining the total quantity of cells according to the quantity of cells comprised in each SCS group.

17. The terminal device according to claim 16, wherein when the quantity of cells comprised in each SCS group is being determined, a quantity of cells for an $i^{th}$ first cell serving as a self-scheduling cell is denoted as $(1+F_i)$, wherein $F_i$ is a weighting factor of the first cell serving as the self-scheduling cell, $i=1, 2, \ldots, n$, and n indicates a quantity of first cells serving as self-scheduling cells; or when the quantity of cells comprised in each SCS group is being determined, a quantity of cells for an $j^{th}$ first cell serving as a scheduled cell of the another cell is denoted as $(1+G_j)$, wherein $G_j$ is a weighting factor of the first cell serving as the scheduled cell of the another cell, $j=1, 2, \ldots, m$, and m is a quantity of first cells serving as the scheduled cell of the another cell.

18. The terminal device according to claim 17, wherein each of $F_i$ or $G_j$ is a rational number greater than 0 and less than 1.

19. The terminal device according to claim 17, wherein $F_i$ or $G_j$ is predefined, configured by a network, or determined according to capability-related information of the terminal device.

20. The terminal device according to claim 17, wherein:

a maximum PDCCH processing capability allocated to the $i^{th}$ first cell serving as the self-scheduling cell does not exceed a first target maximum PDCCH processing capability, and the first target maximum PDCCH processing capability is determined according to $F_i$; and a maximum PDCCH processing capability allocated to the $j^{th}$ first cell serving as the scheduled cell of the another cell does not exceed a second target maximum PDCCH processing capability, and the second target maximum PDCCH processing capability is determined according to $G_j$.

* * * * *